(12) United States Patent
Sylves

(10) Patent No.: US 9,105,042 B2
(45) Date of Patent: Aug. 11, 2015

(54) CUSTOMER SENTIMENT ANALYSIS USING RECORDED CONVERSATION

(71) Applicant: Verizon Patent and Licensing Inc., Basking Ridge, NJ (US)

(72) Inventor: Eric F. Sylves, Wilmington, DE (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 241 days.

(21) Appl. No.: 13/761,893

(22) Filed: Feb. 7, 2013

(65) Prior Publication Data

US 2014/0220526 A1    Aug. 7, 2014

(51) Int. Cl.
*G10L 17/00*  (2013.01)
*G10L 21/00*  (2013.01)
*G06Q 30/02*  (2012.01)
*G10L 15/00*  (2013.01)
*G06Q 10/06*  (2012.01)

(52) U.S. Cl.
CPC ...... *G06Q 30/0201* (2013.01); *G06Q 10/06395* (2013.01); *G10L 15/00* (2013.01)

(58) Field of Classification Search
None
See application file for complete search history.

(56) References Cited

U.S. PATENT DOCUMENTS

| 6,665,644 | B1 | 12/2003 | Kanevsky et al. |
| 7,650,331 | B1 | 1/2010 | Dean et al. |
| 7,912,720 | B1 * | 3/2011 | Hakkani-Tur et al. ........ 704/270 |
| 7,983,910 | B2 | 7/2011 | Subramanian et al. |
| 8,204,749 | B2 * | 6/2012 | Hakkani-Tur et al. ........ 704/270 |
| 8,209,182 | B2 * | 6/2012 | Narayanan ................... 704/270 |
| 8,214,214 | B2 | 7/2012 | Bennett |
| 8,266,148 | B2 | 9/2012 | Guha et al. |
| 2013/0080169 | A1 * | 3/2013 | Harada et al. ................ 704/249 |
| 2014/0236598 | A1 * | 8/2014 | Fructuoso et al. ........... 704/249 |

* cited by examiner

*Primary Examiner* — Satwant Singh

(57) ABSTRACT

A system is configured to receive voice emotion information, related to an audio recording, indicating that a vocal utterance of a speaker is spoken with negative or positive emotion. The system is configured to associate the voice emotion information with attribute information related to the audio recording, and aggregate the associated voice emotion and attribute information with other associated voice emotion and attribute information to form aggregated information. The system is configured to generate a report based on the aggregated information and one or more report parameters, and provide the report.

20 Claims, 9 Drawing Sheets

| Audio ID 510 | Speaker ID 520 | Speaker Location 530 | Emotion Type 540 | Emotion Keyword 550 | Term Count 560 | Emotion Duration (Seconds) 570 | Call Subject 580 | Product 590 |
|---|---|---|---|---|---|---|---|---|
| 105-A | J. Davis | 14 Main St. | negative | "bill" | 10 | 15.9 | billing | Corporate Plan |
| 105-B | Rep-029 | Chicago | positive | "resolved" | 4 | 6.2 | billing | Corporate Plan |
| 328-A | 555-123-4567 | 60514 | negative | "fees" | 3 | 4.4 | tech support | Pre-pay Plan |
| 328-B | Rep-008 | Chicago | negative | "difficult" | 12 | 19.7 | tech support | Pre-pay Plan |

CUSTOMER SENTIMENT ANALYSIS USING RECORDED CONVERSATION

BACKGROUND

Profit and non-profit entities, such as businesses, retail stores, telephone service providers, and/or charitable organizations, often employ representatives who interact with other individuals, including current and potential customers. These entities may record interactions between their representatives and customers. The recorded interactions may be helpful in assessing the quality of interactions between representatives and customers.

BRIEF DESCRIPTION OF THE DRAWINGS

FIG. 5 is a diagram of an example data structure that stores aggregated information;

DETAILED DESCRIPTION

The following detailed description of example implementations refers to the accompanying drawings. The same reference numbers in different drawings may identify the same or similar elements.

A caller, such as a customer communicating with a company employee at a company call center, may communicate about products or services offered by the company. The company may record the caller's communication. Additionally, the company may also record and/or maintain attribute information about the communication (e.g., a communication location, a product or service that was the subject of the communication, a quantity of times that this caller has called the company call center about this subject, etc.). Implementations described herein may allow a company to identify the emotional content of a communication and join the emotional content with attribute information about the caller's communication.

Figure 1:
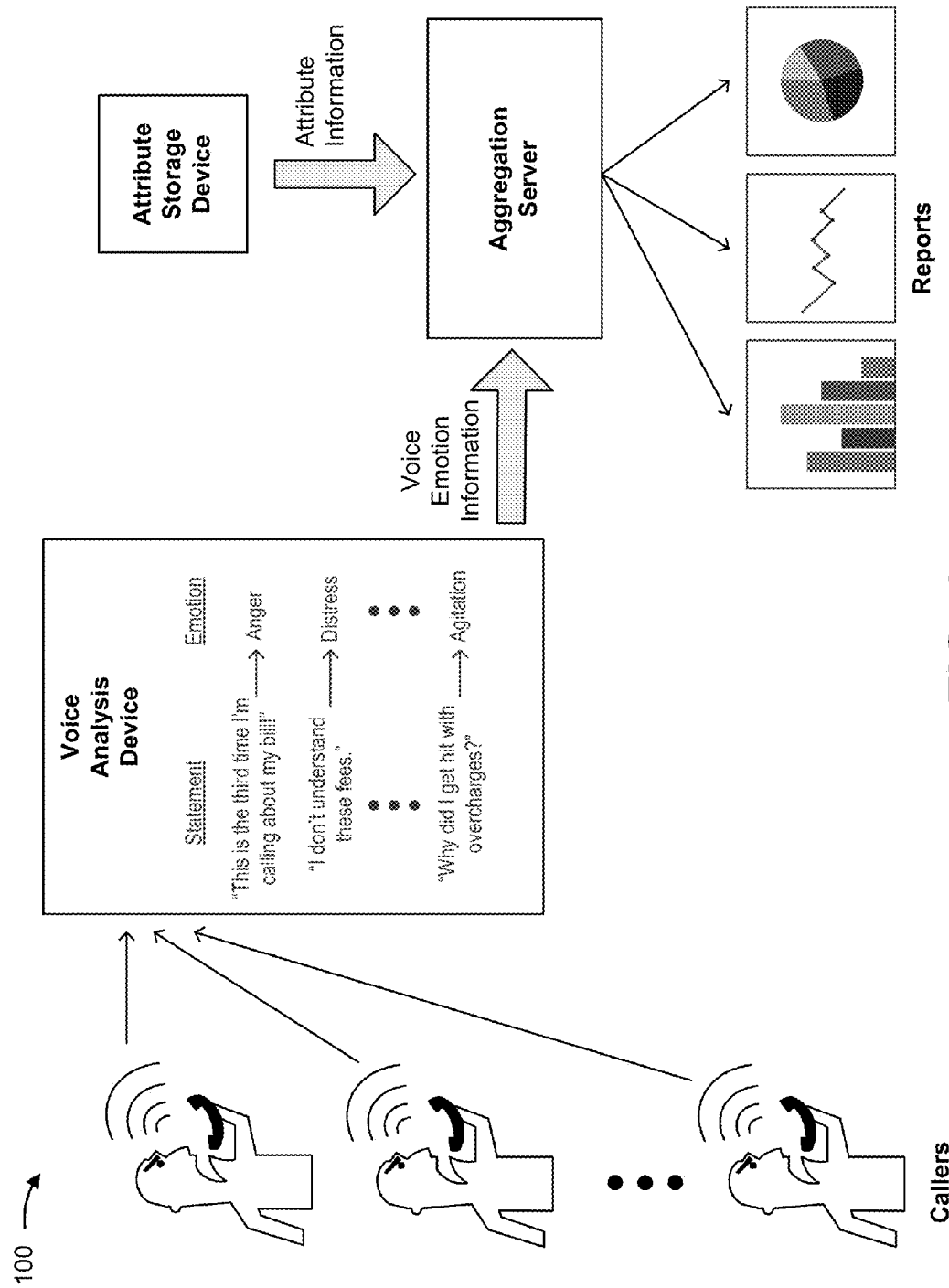
FIG. 1 is an overview of an example implementation described herein.

FIG. 1 is a diagram of an overview of an example implementation 100 described herein. As shown in FIG. 1, example implementation 100 may include one or more callers, one or more audio statements, a voice analysis device, an attribute storage device, an aggregation server, and one or more reports.

As shown in FIG. 1, the audio statements may be made by one or more callers (e.g., cell phone customers calling representatives of their cell phone service provider, Internet customers calling representatives of their Internet service provider, or the like). A voice analysis device may detect voice emotion information in the audio statements by identifying words and phrases stated with negative or positive emotion. For example, the voice analysis device may detect that a first caller statement about a cell phone bill is made with negative emotion, such as anger, and may further detect that a second caller statement about fees is made with distress. The aggregation server may receive the voice emotion information.

As further shown in FIG. 1, the aggregation server may also receive attribute information, associated with a caller, from an attribute storage device. For example, attribute information may include a caller's name, a caller's location, a product or service identified with the caller, a quantity of times that the caller has called, etc. The aggregation server may associate and aggregate the attribute information received from the attribute storage device with the voice emotion information received from the voice analysis device. Based on report parameters, the aggregation server may generate a report of some portion of the aggregated information. For example, the aggregation server may generate a report displaying the number of callers with a particular cell phone who discuss their cell phone bills with negative emotion. Implementations described herein may allow a company to use voice emotion information and attribute information to better assess problems with customers, employees, products, or the like.

Figure 2:
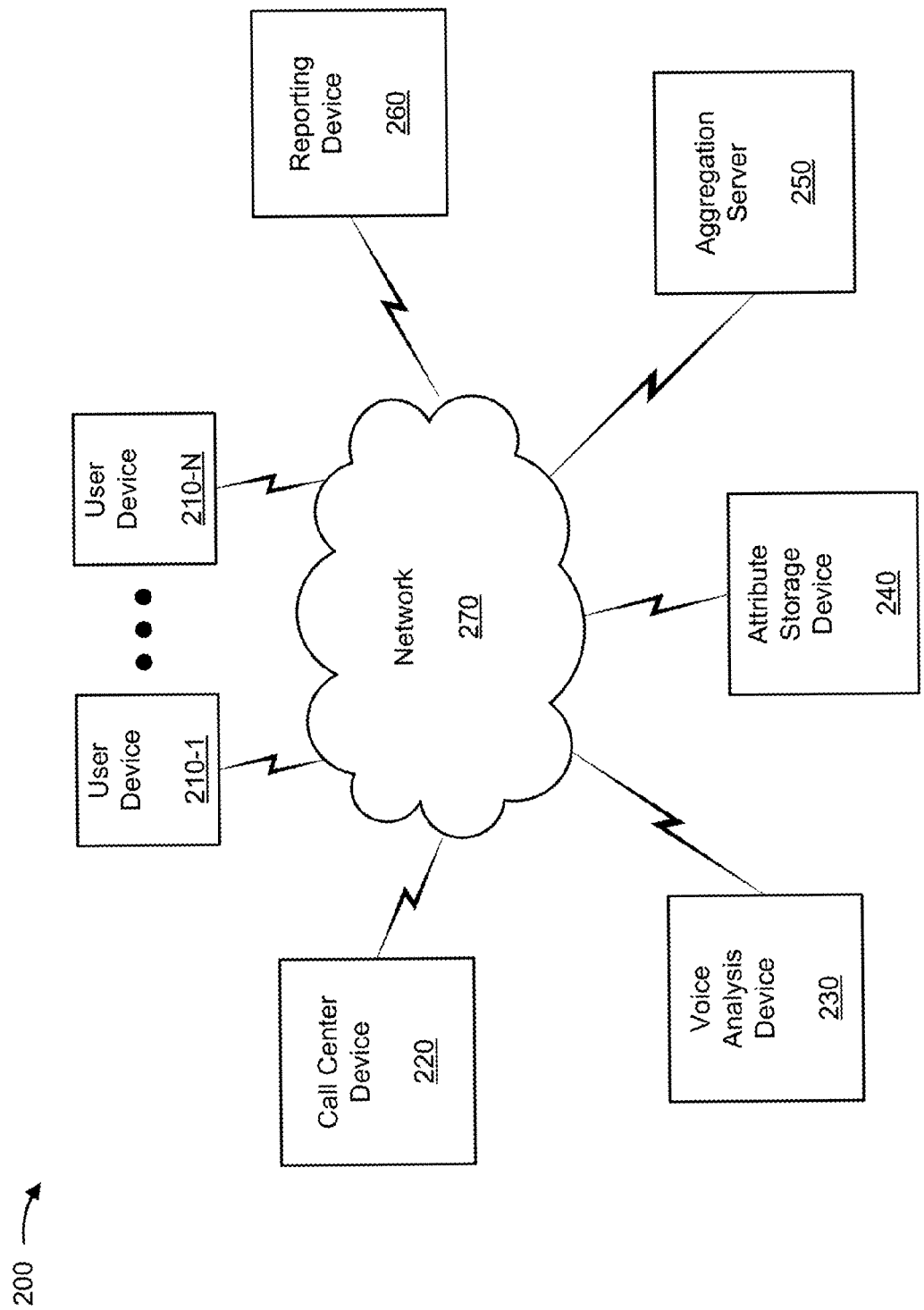
FIG. 2 is a diagram of an example environment in which systems and/or methods described herein may be implemented.

FIG. 2 is a diagram of example environment 200 in which systems and/or methods described herein may be implemented. As shown in FIG. 2, environment 200 may include one or more user devices 210-1 through 210-N (N≥1) (hereinafter referred to collectively as "user devices 210," and individually as "user device 210"), a call center device 220, a voice analysis device 230, an attribute storage device 240, an aggregation server 250, a reporting device 260, and a network 270.

User device 210 may include a device capable of transmitting audio information. For example, user device 210 may include a landline telephone (e.g., a payphone, a home telephone, etc.), a mobile phone (e.g., a smart phone, a radiotelephone, etc.), a computing device (e.g., a desktop computer, a laptop computer, a tablet computer, a handheld computer, etc.), or a similar device. User device 210 may be associated with a speaker (e.g., a caller). In some implementations, user device 210 may communicate vocal utterances of a speaker to call center device 220. Additionally, or alternatively, user device 210 may receive information from and/or transmit information to voice analysis device 230, attribute storage device 240, aggregation server 250, reporting device 260, and/or network 270.

Call center device 220 may include a device capable of receiving and/or recording voice communication information from one or more communication devices. For example, call center device 220 may be associated with an office of one or more call center representatives capable of making and/or receiving telephone calls to user devices 210 using one or more call center devices 220. Call center device 220 may be associated with a speaker (e.g., a call center representative) capable of communicating with a speaker associated with user device 210 (e.g., a caller).

In some implementations, call center device 220 may automatically record voice communication information when the voice communication information is associated with a particular speaker and/or a particular location. For example, call center device 220 may record calls directed to a particular call center location, a particular call center department, a particular telephone extension, a particular call center representative, etc. Additionally, or alternatively, call center device 220 may automatically record voice communication information based on voice emotion information and/or attribute information associated with a speaker. For example, call center device 220 may record calls involving a caller known to have high negative and/or positive emotion, a call center representative whose voice emotion has exceeded a threshold, or the like. Additionally, or alternatively, call center device 220 may record only the utterances associated with a particular speaker. For example, during a call between a caller and a call center representative, call center device 220 may record only the utterances of the call center representative and not the utterances of the caller.

In some implementations, call center device 220 may send voice communication information to voice analysis device 230. For example, call center device 220 may make an audio recording of the voice communication between two speakers (e.g., between a caller and a call center representative) and may send the audio recording to voice analysis device 230. Alternatively, call center device 220 may stream the audio to voice analysis device 230 without making a recording. Additionally, or alternatively, call center device 220 may receive information from and/or transmit information to, attribute storage device 240, aggregation server 250, reporting device 260, and/or network 270.

Voice analysis device 230 may include a device capable of analyzing a voice communication to identify content for which a speaker exhibited emotion. Voice analysis device 230 may include a computing device, such as a server, a desktop computer, a laptop computer, a handheld computer, or a similar device. Voice analysis device 230 may analyze the prosodic elements of speech (e.g., a vocal pitch, a vocal loudness, a vocal rhythm, a vocal statement duration, etc.) to identify emotional content. In some implementations, voice analysis device 230 may analyze the frequency, wavelength, and amplitude of an audio wave (e.g., perform waveform analysis) associated with a voice communication to identify the emotional content of the voice communication, and/or to analyze the unique speech patterns that identify a particular speaker. In some implementations, voice analysis device 230 may receive voice communication information from call center device 220, and may send voice emotion information to aggregation server 250. Additionally, or alternatively, voice analysis device 230 may receive information from and/or transmit information to user device 210, attribute storage device 240, reporting device 260, and/or network 270.

Attribute storage device 240 may include a device capable of storing attribute information. Attribute storage device 240 may include a computer device, such as a server, a desktop computer, a laptop computer, a handheld computer, or a similar device. Attribute storage device 240 may include or communicate with a memory device that stores attribute information. In some implementations, attribute storage device 240 may send attribute information to aggregation server 250. Additionally, or alternatively, attribute storage device 240 may receive information from and/or transmit information to user device 210, call center device 220, voice analysis device 230, reporting device 260, and/or network 270.

Aggregation server 250 may include one or more servers capable of associating and aggregating information. In some implementations, aggregation server 250 may include a computing device, such as a server, a desktop computer, a laptop computer, a handheld computer, or a similar device. In some implementations, aggregation server 250 may receive voice emotion information from voice analysis device 230. The voice emotion information may include information identifying the emotional content of an audio recording. Additionally, or alternatively, aggregation server 250 may receive attribute information from attribute storage device 240. Attribute information may include information associated with an audio recording (e.g., an audio recording source, an audio recording location, a product or service identified with an audio recording, etc.).

In some implementations, aggregation server 250 may associate the voice emotion information with attribute information. Additionally, or alternatively, aggregation server 250 may generate aggregated information by aggregating the associated voice emotion and attribute information with other associated voice emotion and attribute information. In some implementations, aggregation server 250 may receive report parameters from reporting device 260. Additionally, or alternatively, aggregation server 250 may generate a report based on the aggregated information and the report parameters, and may send the report to reporting device 260. Additionally, or alternatively, aggregation server 250 may receive information from and/or transmit information to user device 210, call center device 220, and/or network 270.

Reporting device 260 may include one or more devices capable of receiving, generating, analyzing, processing, and/or outputting a report. For example, reporting device 260 may include a computing device, such as a server, a desktop computer, a laptop computer, a handheld computer, or a similar device. In some implementations, reporting device 260 may include a display that outputs information from reporting device 260 and/or that allows a user to provide input to reporting device 260. Additionally, or alternatively, reporting device 260 may allow users to input reporting parameters. In some implementations, reporting device 260 may send the reporting parameters to aggregation server 250, and may receive a report from aggregation server 250. Additionally, or alternatively, reporting device 260 may receive information from and/or transmit information to user device 210, call center device 220, voice analysis device 230, attribute storage device 240, and/or network 270.

Network 270 may include one or more wired and/or wireless networks. For example, network 270 may include a cellular network, a public land mobile network ("PLMN"), a second generation ("2G") network, a third generation ("3G") network, a fourth generation ("4G") network, a fifth generation ("5G") network, a long term evolution ("LTE") network, and/or another network. Additionally, or alternatively, network 270 may include a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, and/or a combination of these or other types of networks.

The number of devices and networks shown in FIG. 2 is provided for explanatory purposes. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. For example, any two or more of user device 210, call center device 220, voice analysis device 230, attribute storage device 240, aggregation server 250, and/or reporting device 260 could be implemented within a single device or a single collection of devices. Additionally, one or more of the devices of environment 200 may perform one or more functions described as being performed by another one or more devices of environment 200. Devices of environment 200 may interconnect via wired connections, wireless connections, or a combination of wired and wireless connections.

Figure 3:
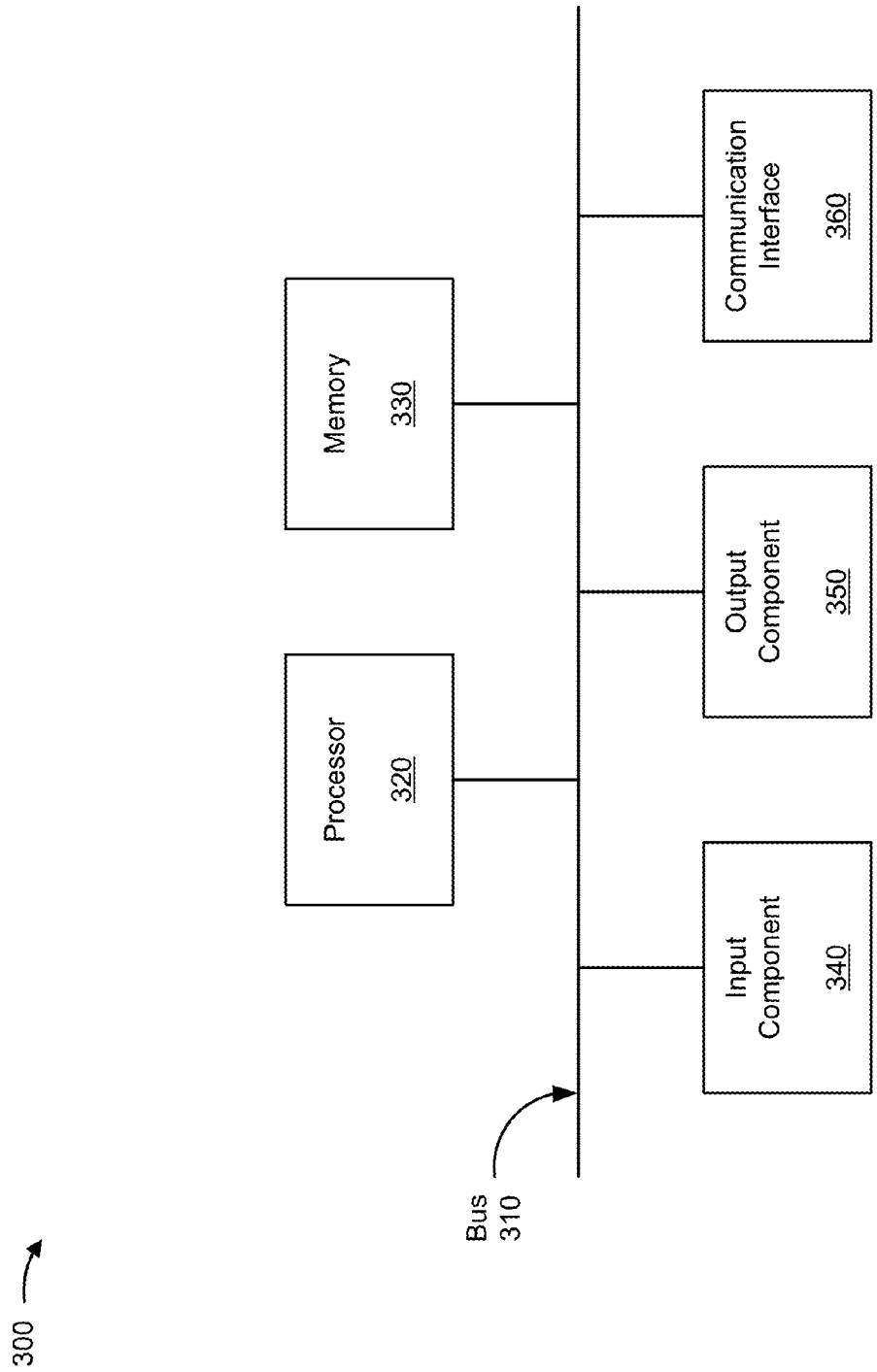
FIG. 3 is a diagram of components of one or more devices of FIG. 2.

FIG. 3 is a diagram of example components of a device 300. Device 300 may correspond to voice analysis device 230, attribute storage device 240, aggregation server 250, and/or reporting device 260. Additionally, or alternatively, each of user device 210, call center device 220, voice analysis device 230, attribute storage device 240, aggregation server 250, and/or reporting device 260 may include one or more devices 300 and/or one or more components of device 300. As illustrated in FIG. 3, device 300 may include a bus 310, a processor 320, a memory 330, an input component 340, an output component 350, and a communication interface 360.

Bus 310 may include a path that permits communication among the components of device 300. Processor 320 may include a processor (e.g., a central processing unit, a graphics processing unit, an accelerated processing unit), a microprocessor, and/or any processing logic (e.g., a field-programmable gate array ("FPGA"), an application-specific integrated circuit ("ASIC"), etc.) that interprets and/or executes instructions. Memory 330 may include a random access memory ("RAM"), a read only memory ("ROM"), and/or another type of dynamic or static storage device (e.g., a flash, magnetic, or optical memory) that stores information and/or instructions for use by processor 320.

Input component 340 may include a component that permits a user to input information to device 300 (e.g., a touch screen display, a keyboard, a keypad, a mouse, a button, a switch, etc.). Output component 350 may include a component that outputs information from device 300 (e.g., a display, an audio speaker, one or more light-emitting diodes ("LEDs"), etc.).

Communication interface 360 may include a transceiver-like component, such as a transceiver and/or a separate receiver and transmitter that enables device 300 to communicate with other devices, such as via a wired connection, a wireless connection, or a combination of wired and wireless connections. For example, a communication interface 360 may include an Ethernet interface, an optical interface, a coaxial interface, an infrared interface, a radio frequency ("RF") interface, a universal serial bus ("USB") interface, or the like.

Device 300 may perform various operations described herein. Device 300 may perform these operations in response to processor 320 executing software instructions included in a computer-readable medium, such as memory 330. A computer-readable medium may be defined as a non-transitory memory device. A memory device may include memory space within a single storage device or memory space spread across multiple storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided for explanatory purposes. In practice, device 300 may include additional components, fewer components, different components, or differently arranged components than those shown in FIG. 3.

Figure 4:
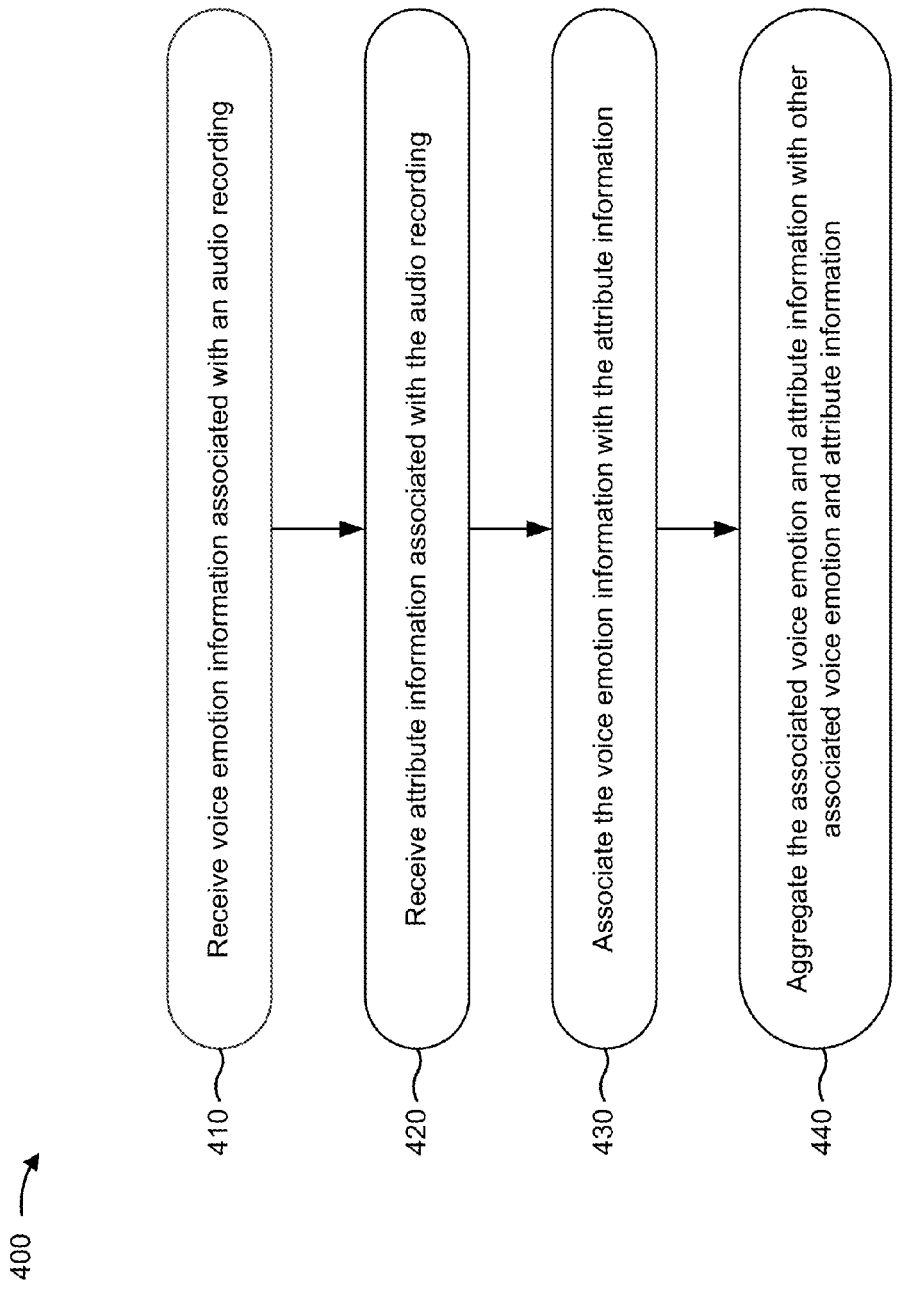
FIG. 4 is a flow chart of an example process for aggregating voice emotion and attribute information.

FIG. 4 is a flow chart for an example process 400 for aggregating voice emotion and attribute information. In some implementations, one or more process blocks of FIG. 4 may be performed by aggregation server 250. Additionally, or alternatively, one or more process blocks of FIG. 4 may be performed by another device or a group of devices separate from or including aggregation server 250, such as user device 210, call center device 220, voice analysis device 230, attribute storage device 240, and/or reporting device 260.

As shown in FIG. 4, process 400 may include receiving voice emotion information associated with an audio recording (block 410). For example, aggregation server 250 may receive, from voice analysis device 230, voice emotion information associated with an audio recording (e.g., a digital recording, an analog recording, etc.), such as a recorded conversation between a first speaker (e.g., a caller) and a second speaker (e.g., a call center representative). Voice emotion information may include negative and/or positive emotions associated with one or more words or phrases within the audio recording. Additionally, or alternatively, voice analysis device 230 may convert one or more utterances associated with the audio recording to text by use of a speech-to-text converter (e.g., a speech recognition software program and/or device).

In some implementations, voice analysis device 230 may analyze the audio recording and identify negative and/or positive emotions associated with particular words and/or statements. For example, voice analysis device 230 may identify emotions by analyzing one or more vocal prosody characteristics (e.g., a tone, a volume, a pitch, an intonation, an inflection, a duration, etc.) of an utterance by a speaker associated with the audio recording. For example, a word in an utterance may be associated with negative emotion when the vocal prosody characteristics of the utterance indicate that the word is used with negative emotion, such as when the word is used with a certain volume, intonation, inflection, etc. Alternatively, the same word may be associated with positive emotion when the vocal prosody characteristics of the utterance indicate that the word is used with positive emotion.

Additionally, or alternatively, voice analysis device 230 may analyze one or more vocal prosody characteristics of the utterance to determine a baseline prosody. For example, the baseline prosody may be determined by analyzing the vocal prosody characteristics of a quantity of utterances by a speaker to establish a range of usual vocal prosody characteristics associated with neither negative or positive emotion. In this instance, voice analysis device 230 may identify words and/or phrases with negative and/or positive emotion by identifying words and/or phrases that differ from the baseline prosody of the utterance. For example, voice analysis device 230 may analyze a vocal prosody characteristic of an utterance (e.g., a volume) to establish a baseline prosody (e.g. a volume range from 60 dB to 65 dB), and may determine that a word that differs from the baseline prosody by a particular amount (e.g., a word spoken at 70 dB) is associated with a negative emotion.

In some implementations, voice analysis device 230 may adjust the baseline prosody based on voice emotion information and/or attribute information associated with a speaker. For example, voice analysis device 230 may adjust the baseline prosody of the speaker (e.g., a caller) to change the number and type of emotions detected based on the speaker's past utterances (e.g., the caller's call history). In this instance, the baseline prosody associated with an angry caller who has frequently called regarding a bill may be changed so that a greater deviation from the baseline prosody will be needed to detect a negative or positive emotion. Additionally, or alternatively, voice analysis device 230 may adjust the baseline prosody of a speaker (e.g., a call center representative) depending on attributes about the speaker (e.g., the number of calls a call center representative has responded to, the number of irate callers the call center representative has spoken with, the length of time that the call center representative has been working, etc.).

In some implementations, voice analysis device 230 may normalize the voice emotion information associated with a particular speaker. For example, voice analysis device 230 may use voice emotion information, or historical information concerning a particular speaker, to determine that the particular speaker may be more or less emotive, on average, than a general population of speakers. Aggregation server 250 may normalize the voice emotion information associated with the speaker by adjusting the voice emotion information accordingly (e.g., by raising values associated with the voice emotion information) to conform to the voice emotion characteristics of the general population of speakers.

In some implementations, voice analysis device 230 may identify when the audio recording contains utterances from more than one speaker. For example, voice analysis device 230 may identify that the audio recording contains utterances made by a first speaker (e.g., a caller) and utterances made by a second speaker (e.g., a call center representative). In some implementations, voice analysis device 230 may utilize one or more utterance characteristics (e.g., vocal prosody, timbre, waveform amplitude, waveform frequency, etc.) to identify the first speaker or the second speaker as the source of an utterance. Voice analysis device 230 may use the one or more utterance characteristics to distinguish overlapping utterances, such as when two speakers communicate at the same time. Additionally, or alternatively, voice analysis device 230 may identify the source of an utterance by comparing the one or more utterance characteristics to a data structure of known utterance characteristics of one or more known speakers (e.g., a biometric voice data structure). For example, voice analysis device 230 may have access to a data structure that stores voice patterns for call center representatives. Additionally, or alternatively, voice analysis device 230 may identify when an audio recording includes overlapping or unintelligible utterances and may omit the portion of the audio recording that includes the overlapping or unintelligible utterances from analysis.

In some implementations, voice emotion information may include information defining the start time and end time of words and/or phrases uttered with negative or positive emotion. The start and end times may be useful to identify where, in an audio recording, words and/or phrases are stated with negative or positive emotion. Additionally, or alternatively, the start and end times may be useful for determining the length of a word and/or phrase associated with a negative or positive emotion. In some implementations, voice emotion information may include a unique identifier that identifies a particular speaker, and/or a particular audio recording. Additionally, or alternatively, the unique identifier may be useful for joining the voice emotion information of a particular speaker and/or audio recording with attribute information associated with that particular speaker and/or audio recording.

In some implementations, voice analysis device 230 may identify a particular emotion and associate the particular emotion with a keyword or phrase. For example, voice analysis device 230 may compare the vocal prosody characteristics of a word and/or phrase associated with an audio recording to the vocal prosody characteristics of a known set of emotions (e.g., anger, distress, agitation, etc.) and may associate the word and/or phrase with the emotion whose vocal prosody characteristics are the closest match. For example, a word stated loudly and quickly may be associated with anger. Additionally, or alternatively, voice analysis device 230 may designate those words and/or phrases, whose vocal prosody characteristics do not meet a threshold similarity to the vocal prosody characteristics of the known set of emotions as words and/or phrases, without negative or positive emotion. In some implementations, voice analysis device 230 may associate an emotion with an entire phrase or conversation. Additionally, or alternatively, voice analysis device may associate the emotion with only those words and/or phrases stated with negative or positive emotion (e.g., a keyword).

As further shown in FIG. 4, process 400 may include receiving attribute information associated with the audio recording (block 420). For example, aggregation server 250 may receive attribute information from attribute storage device 240. In some implementations, attribute information may include information associated with an audio recording. For example, attribute information may include a unique audio recording identifier. The unique audio recording identifier may include a string of characters (e.g., numbers, letters, and/or symbols), and may be useful for identifying an audio recording and associating the audio recording with other voice emotion and attribute information. Additionally, or alternatively, attribute information may include a unique identification number identifying a speaker on the audio recording (e.g., a caller, a call center representative, etc.), such as a speaker's name, a speaker's service provider account number, a speaker's employee identification number, or the like. In some implementations, the unique audio recording identifier may change as the audio recording progresses. For example, the unique audio recording identifier may be modified based on attribute information associated with the audio recording.

Attribute information may include information noting the time of a communication (e.g., a timestamp) and/or the duration of a communication. The time and duration information may be useful for comparing a speaker's emotional content for a word and/or statement to the total duration of the speaker's communication (e.g., for determining a percentage of the communication for which the speaker exhibited negative and/or positive emotion). Attribute information may include product information about a product and/or service discussed in the audio recording, and/or information identifying a device used by a speaker, such as information identifying a cell phone model (e.g., "smart phone model X"), a telephone type (e.g., a touchtone telephone), etc. The product and/or service information may be useful for determining a speaker's sentiment toward the product and/or service (e.g., assessing a customer's satisfaction with a recently purchased service, assessing a customer's frustration with a malfunctioning product, etc.). In some implementations, attribute information (e.g., information identifying a product and/or service) may be related to all of the keywords and/or emotions associated with a communication (e.g., a conversation, an utterance, etc.), or may be related to a single keyword and/or emotion associated with the communication.

Attribute information may include a location for one or more of the speakers (e.g., a caller location, a call center location, etc.). The location may be useful for assessing the voice sentiment of a quantity of speakers associated with a particular location (e.g., a particular call center). In some implementations, attribute information may include information associated with a particular speaker, such as historical information about prior conversations (e.g., a customer history) involving this speaker, information identifying a device used by this speaker to communicate (e.g., a phone call made with a particular cell phone), etc.

In some implementations, attribute information may include information provided by a speaker (e.g., a caller, a call center representative, etc.). For example, attribute storage device 240 may receive attribute information provided by a speaker from user device 210. Additionally, or alternatively, attribute storage device 240 may receive attribute information provided by a speaker by use of an interactive voice response unit ("IVRU"). In some implementations, attribute storage device 240 may receive attribute information from call center device 220 (e.g., information provided by a call center representative). The attribute information may include information about the communication between two or more speakers (e.g., a record of the conversation between a caller and a call center representative, information generated by a call center representative, etc.).

As further shown in FIG. 4, process 400 may include associating the voice emotion information with the attribute information (block 430). For example, aggregation server 250 may associate voice emotion information received from voice analysis device 230 with attribute information received from attribute storage device 240.

In some implementations, aggregation server 250 may join voice emotion information with attribute information by use of an audio identifier. For example, aggregation server 250 may receive voice emotion information containing words and/or statements spoken with negative and/or positive emotion in a particular audio recording identified with a unique audio identifier. Additionally, aggregation server 250 may receive attribute information (e.g., information identifying a time, a caller, a call center representative, etc.) relating to the same audio recording identified with the unique audio identifier. Aggregation server 250 may associate the voice emotion information with the attribute information by matching the unique audio identifier.

Additionally, or alternatively, aggregation server 250 may use information identifying a speaker (e.g., information identifying a particular caller) with a particular audio recording to join voice emotion information and attribute information. For example, aggregation server 250 may receive voice emotion information identifying a particular caller as the source of the utterances on an audio recording. Additionally, aggregation server 250 may receive attribute information relating to the same caller, such as a call history, a product and/or service recently purchased by the caller, etc.

In some implementations, aggregation server 250 may associate voice emotion information with attribute information selectively. For example, an utterance (e.g., a conversation) may include a set of keywords and associated negative and/or positive emotions. In this instance, aggregation server 250 may associate the attribute information with the entire set of keywords and associated emotions. Additionally, or alternatively, aggregation server 250 may associate the attribute information with a subset of the set of keywords and associated emotions. For example, aggregation server 250 may associate attribute information, such as information identifying a product and/or a service, related to an utterance with all of the words and/or phrases in the utterance stated with negative or positive emotion. Additionally, or alternatively, aggregation server 250 may associate the product and/or service with a single word and/or phrase in the utterance.

In some implementations, aggregation server 250 may associate the voice emotion and attribute information by use of a distributed computing framework capable of supporting parallel computational analysis of large sets of information, such as a HADOOP framework. For example, one or more server devices (e.g., one or more local servers) associated with aggregation server 250 may receive one or more audio recordings of one or more utterances. Aggregation server 250 may systematically add call header information (e.g., information identifying a call, a caller, a call center, a call center representative, an IVRU subject matter, a call start time, a call end time, etc.) to digital files associated with the one or more audio recordings. Aggregation server 250 may use a data structure of known utterance characteristics of one or more known speakers (e.g., a biometric voice data structure) to identify and/or flag one or more portions of an utterance spoken by a particular speaker (e.g., a call center representative) associated with the one or more audio recordings.

In some implementations, aggregation server 250 may associate and aggregate the voice emotion and attribute information while the utterances are being recorded, such as during a call between a caller and a call center representative. Additionally, or alternatively, aggregation server 250 may associate and aggregate the voice emotion and attribute information at certain intervals (e.g., a scheduled batch run on the one or more local servers).

As further shown in FIG. 4, process 400 may include aggregating the associated voice emotion and attribute information with other associated voice emotion and attribute information associated with other audio recordings (block 440). For example, aggregation server 250 may aggregate the voice emotion and attribute information from a first audio recording with other associated voice emotion and attribute information from multiple other audio recordings. Aggregation server 250 may store the aggregated information in a data structure with other audio recording information.

While a series of blocks has been described with regard to FIG. 4, the blocks and/or the order of blocks may be modified in some implementations. Additionally, or alternatively, non-dependent blocks may be performed in parallel.

FIG. 5 is a diagram of an example data structure 500 that stores aggregated information. Data structure 500 may be stored in a memory device (e.g., a RAM, a hard disk, etc.) and/or may be stored using a distributed file system (e.g., HADOOP Distributed File System) associated with one or more devices and/or components shown in FIGS. 2 and 3. For example, data structure 500 may be stored by aggregation server 250, and/or reporting device 260.

Data structure 500 may include a collection of fields, such as an audio identification (ID) field 510, a speaker identification (ID) field 520, a speaker location field 530, an emotion type field 540, an emotion keyword field 550, a term count field 560, an emotion duration field 570, a call subject field 580, and a product field 590.

Audio identification field 510 may store information that identifies an audio recording. In some implementations, the information may be a string of characters, such as numbers, letters, and/or symbols, that uniquely identifies an audio recording. Additionally, or alternatively, the information may encode a time and/or date when the audio recording was made. In some implementations, an audio recording may be divided into two or more audio recordings each containing words and/or statements associated with a single speaker, and a unique identifier for each of the two or more audio recordings.

Speaker identification field 520 may store information that identifies a particular speaker (e.g., a caller, a call center representative, etc.) associated with an audio recording identified in audio identification field 510. For example, the information may be a speaker's name, a speaker's employee identification number, an account number associated with the speaker (e.g., a customer account number), a telephone number associated with the speaker, etc.

Speaker location field 530 may store information that identifies a location associated with the speaker identified in speaker identification field 520. The location information may be stored as a street address, a latitude and longitude coordinate set (e.g., a geo code), a city name, a call center identification number, a zip code, an area code, etc.

Emotion type field 540 may store information that identifies an emotion associated with an audio recording identified in audio identification field 510. In some implementations, the emotion may be expressed as one or more words. For example, emotion type field 540 may store a word identifying a particular emotion (e.g., anger, distress, gratitude, relief, etc.) or category of emotion (e.g., positive, negative, etc.). Additionally, or alternatively, the emotion may be expressed by one or more unique characters, such as letters, numbers, and/or symbols, that represent a particular emotion or category of emotions.

Emotion keyword field 550 may store information that identifies a word or phrase contained in an audio recording identified in audio identification field 510 associated with an emotion identified in emotion type field 540. For example, the word and/or phrase may include a statement by a speaker (e.g., a caller, a call center representative, etc.) associated with negative or positive emotion. In some implementations, emotion keyword field 550 may store an entire statement (e.g., a multi-word product name such as "long distance plan") or a single word (e.g., "bill").

Term count field 560 may store information that identifies the frequency that a particular keyword identified in emotion type field 540 is used during a recording identified in audio identification field 510. For example, the term may include the total number of times a word is used with negative or positive emotion during the course of the audio recording identified in audio identification field 510. Additionally, or alternatively, term count field 560 may store information that identifies the frequency that a particular keyword identified in emotion type field 540 is associated with a particular speaker (e.g., a speaker identified in speaker identification field 520), a particular location (e.g., a location identified in speaker location field 530), a particular call subject (e.g., a subject identified in call subject field 580), a particular product (e.g., a product identified in product field 590), etc.

Emotion duration field 570 may store information that identifies the duration of a word or a phrase stored in emotion keyword field 550 associated with the emotion information stored in emotion type field 540. In some implementations, emotion duration field 570 may store information identifying the starting time and ending time of a word and/or phrase associated with positive or negative emotion. For example, emotion duration field 570 may store information noting the time in an audio recording identified in audio identification field 510 that a word and/or phrase stored in emotion keyword field 550 began and ended. Additionally, or alternatively, emotion duration field 570 may store information expressed as a length of time (e.g., seconds, minutes, etc.) and/or as a quantity of words and/or phrases. In some implementations, emotion duration field 570 may store information that identifies a time or duration associated with a particular speaker (e.g., a speaker identified in speaker identification field 520), a particular location (e.g., a location identified in speaker location field 530), a particular call subject (e.g., a subject identified in call subject field 580), a particular product (e.g., a product identified in product field 590), etc.

Call subject field 580 may store information that identifies the subject of an audio recording identified in audio identification field 510. For example, the subject may include a topic of conversation between a caller and a call center representative, such as a billing charge, a service, a technical support question, etc.

A product field 590 may store information that identifies a product and/or service associated with the speaker identified in speaker identification field 520 and/or associated with the subject identified in call subject field 580. The product and/or service may be stored as a product and/or service name, an identification number, or the like. In some implementations, the product and/or service may be a product and/or service purchased by a speaker (e.g., a calling plan).

Information associated with an audio recording may be conceptually represented as a row in data structure 500. For example, the first row in data structure 500 may correspond to a particular audio recording identified as "105-A" that contains the vocal utterances of a first speaker (e.g., a caller). Aggregation server 250 may associate the audio recording with attribute data received from attribute storage device 240, indicating that the speaker, "J. Davis," is located at "14 Main St.," is communicating about "billing," and has purchased a "Long Distance Plan." Aggregation server 250 may associate the audio recording with voice emotion information received from voice analysis device 230 indicating that the emotion expressed by the speaker was "negative" and contained the keyword "bill." Aggregation server 250 may aggregate the attribute and voice emotion information to determine that the keyword "bill" was used "10" times during the audio recording and that the negative emotion lasted for a total of "15.9" seconds.

The second row in data structure 500 may correspond to a particular audio recording identified as "105-B" that contains the vocal utterances of a second speaker (e.g., a call center representative.) Aggregation server 250 may associate the audio recording with attribute data received from attribute storage device 240, indicating that the speaker, "Rep-029" is located in "Chicago," is communicating about "billing," with a speaker who has purchased a "Long Distance Plan." Aggregation server 250 may associate the audio recording with voice emotion information received from voice analysis device 230 indicating that the emotion expressed by the speaker was "positive" and contained the keyword "resolved." Aggregation server 250 may aggregate the attribute and voice emotion information to determine that the keyword "resolved" was used "4" times during the audio recording and that the positive emotion lasted for a total of "6.2" seconds.

Data structure 500 includes fields 510-590 for explanatory purposes. In practice, data structure 500 may include additional fields, fewer fields, different fields, or differently arranged fields than those illustrated in FIG. 5 and/or described herein with respect to data structure 500. For example, data structure 500 may include a field that links an audio identifier to the corresponding audio recording, a portion of the corresponding audio recording, a transcript of the corresponding audio recording, and/or a portion of the transcript of the corresponding audio recording. Additionally, or alternatively, data structure 500 may include a field that identifies a severity of a negative or positive emotion (e.g., categories within the negative or positive emotion), and/or a field that includes an indicator to identify each segment of a particular duration of the audio recording (e.g., each five minute segment, each ten minute segment, etc.).

Furthermore, while data structure 500 is represented as a table with rows and columns, in practice, data structure 500 may include any type of data structure, such as a linked list, a tree, a hash table, a database, or any other type of data structure. In some implementations, data structure 500 may include information generated by a device and/or component. Additionally, or alternatively, data structure 500 may include information provided from another source, such as information provided by a user, and/or information automatically provided by a device.

Figure 6:
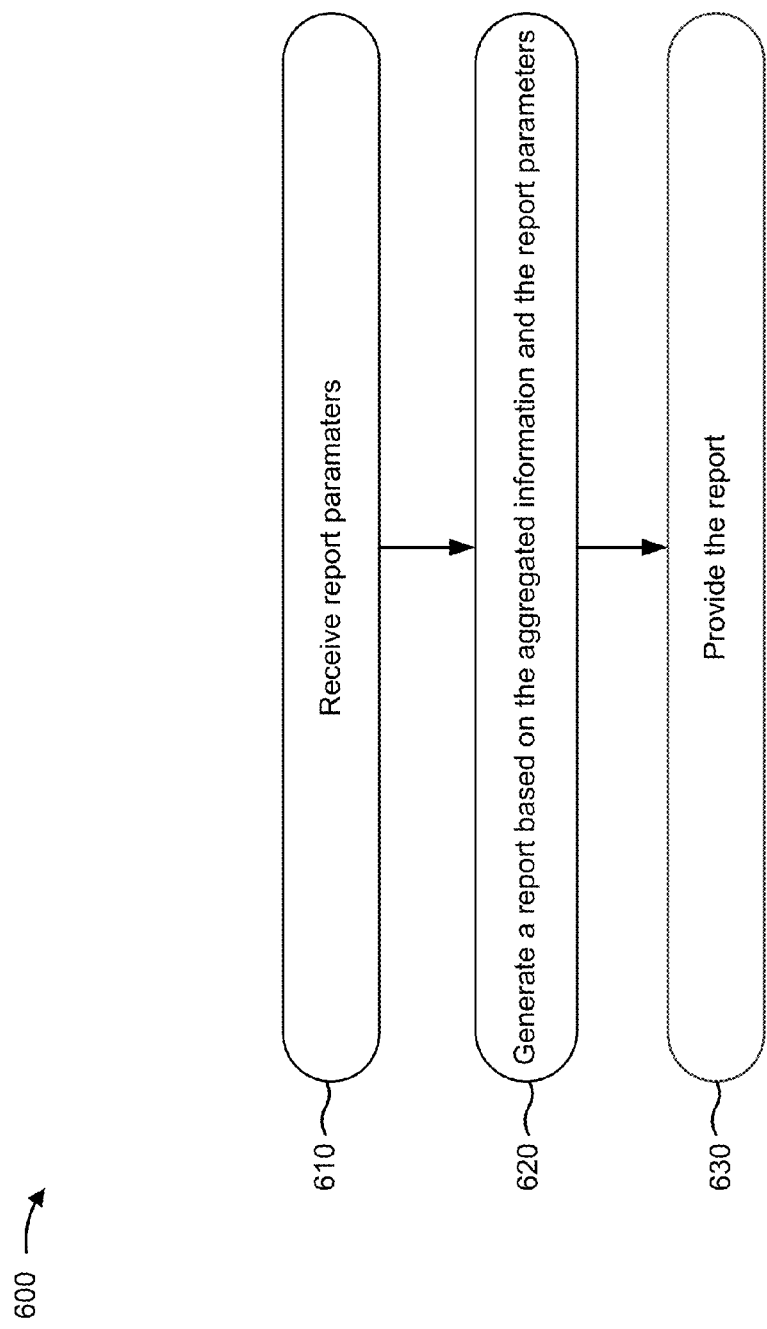
FIG. 6 is a flow chart of an example process for reporting aggregated information.

FIG. 6 is a flow chart for an example process 600 for reporting aggregated information. In some implementations, one or more process blocks of FIG. 6 may be performed by aggregation server 250. Additionally, or alternatively, one or more process blocks of FIG. 6 may be performed by another device or a group of devices separate from or including aggregation server 250, such as user device 210, call center device 220, voice analysis device 230, attribute storage device 240, and/or reporting device 260.

As shown in FIG. 6, process 600 may include receiving report parameters (block 610). For example, aggregation server 250 may receive report parameters from reporting device 260. Report parameters may include any input that identifies an element (e.g., a field, a row, a speaker, an emotion type, a product, etc.) and/or a subset of the aggregated information that is to be used in generating a report. In some implementations, aggregation server 250 may receive report parameters generated automatically (e.g., by a computer, by a default rule, by a business rule, etc.). Additionally, or alternatively, one or more report parameters may be provided by a user of reporting device 260. For example, aggregation server 250 may receive user parameters provided by a user of reporting device 260 that identify certain keywords and/or emotions that are to be included in the report. In some implementations, users of reporting device 260 may provide report parameters by use of a graphical user interface ("GUI").

As further shown in FIG. 6, process 600 may include generating a report based on the aggregated information and the report parameters (block 620). For example, aggregation server 250 may generate a report based on the aggregated information and the report parameters received from reporting device 260. In some implementations, the report may include a table, a spreadsheet, a graph, and/or a chart displaying aggregated information (e.g., a count, a percentage, a trend, etc.) relating to the report parameters. For example, aggregation server 250 may generate a report that includes a chart of common words uttered in an aggravated tone by unique speaker, words uttered in an aggravated tone by subject matter, words uttered in an aggravated tone by speaker location, etc. Additionally, or alternatively, aggregation server 260 may generate a report that may be modified by another device. For example, aggregation server 250 may generate a report that may be modified (e.g., searched, sorted, filtered, etc.) by reporting device 260.

In some implementations, aggregation server 250, when generating a particular report, may aggregate the voice emotion and attribute information by combining the associated information into summary information, and/or by combining the associated information into information composed from some subset of the associated information. For example, aggregation server 250 may aggregate the number of words stated with strong emotion in an audio recording by counting the number of words stated with negative and/or positive emotion and creating a quantity representing the total number of words stated with negative or positive emotion. Additionally, or alternatively, aggregation server 250 may aggregate the percentage of an audio recording that contains words or phrases spoken with strong emotion by counting the duration of words and/or statements made with negative and/or positive emotion, summing the total time, and comparing the total time with the duration of the audio recording.

In some implementations, aggregation server 250, when generating a particular report, may aggregate the number of times a particular keyword (e.g., "bill," "fee," "resolved," etc.) is used with a particular emotion (e.g., anger, agitation, gratitude, etc.). For example, aggregation server 250 may aggregate the keyword by summarizing the number of times the keyword is used in a particular audio recording, the number of times the keyword is used by a particular speaker (e.g., a particular caller, a particular call center representative, etc.), the number of times that the keyword is used at a particular location (e.g., a particular call center), etc. Additionally, or alternatively, aggregation server 250 may aggregate the number of words stated with strong emotion by a particular speaker (e.g., a call center representative) by counting the number of words spoken with negative and/or positive emotion by that particular speaker. Aggregation server 250 may add up the total number of words spoken with strong emotion by the particular speaker during a period of time (e.g., a day, a month, a quarter, etc.).

In some implementations, aggregation server 250, when generating a particular report, may aggregate the voice emotion and attribute information by use of an integrated programming language. Additionally, or alternatively, aggregation server 250 may remove a subset of information from the aggregated information. A smaller subset of aggregated information may be useful for efficiently analyzing the aggregated information. For example, aggregation server 250 may remove unneeded information from the aggregated information.

As further shown in FIG. 6, process 600 may include providing the report (block 630). For example, aggregation server 250 may provide the report for display by reporting device 260. In some implementations, reporting device 260 may further sort, arrange, and/or modify the report. Additionally, or alternatively, reporting device 260 may sort, arrange, and/or modify the report based on input received from a user of reporting device 260. In some implementations, aggregation server 250 may send a report to be displayed in a GUI, such as on a desktop computer, a laptop computer, a monitor, and/or a handheld computing device.

While a series of blocks has been described with regard to FIG. 6, the blocks and/or the order of blocks may be modified in some implementations. Additionally, or alternatively, non-dependent blocks may be performed in parallel.

Figure 7:
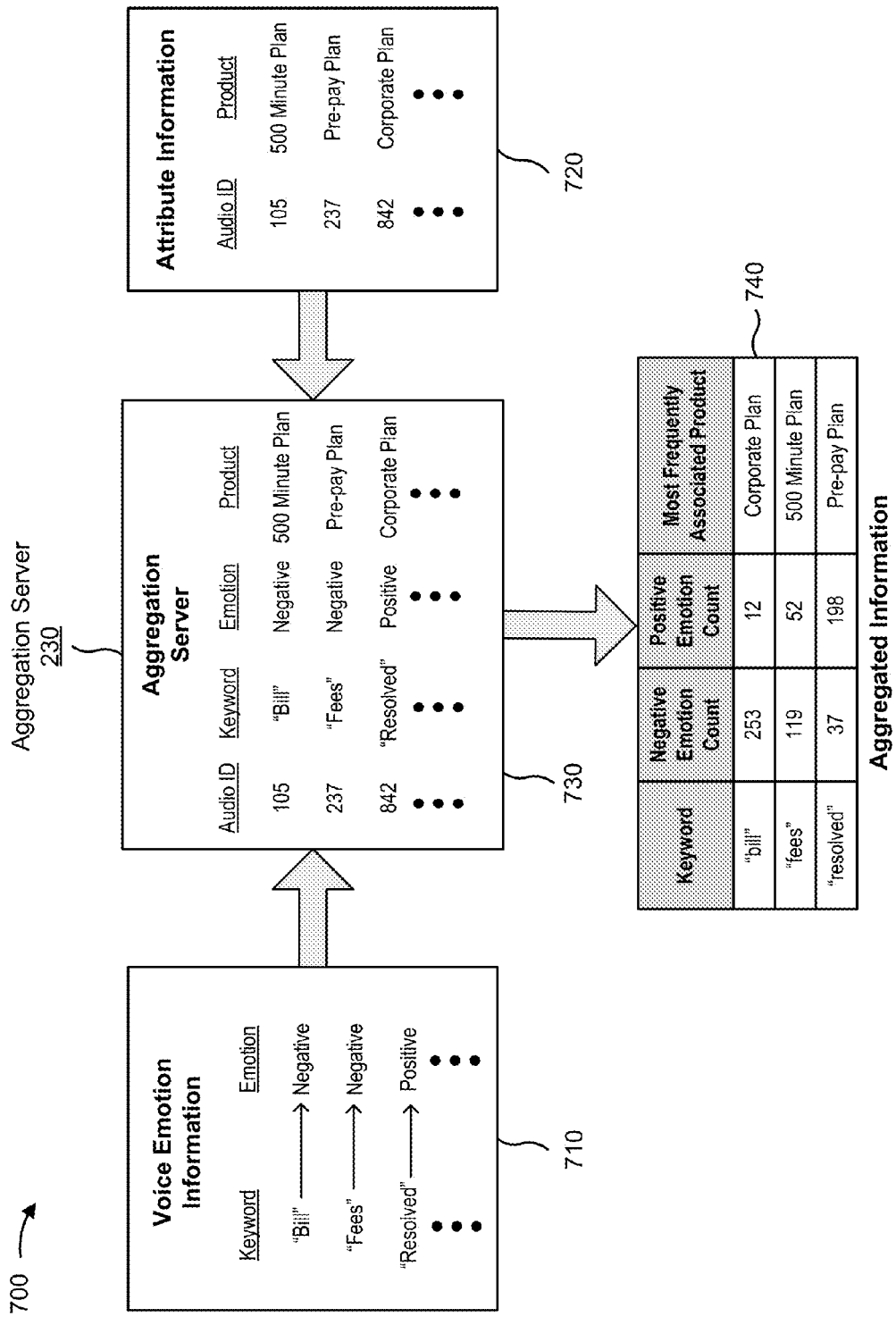
FIGS. 7-9 are diagrams of example implementations described herein.

FIG. 7 is a diagram of an example implementation 700 relating to process 400 shown in FIG. 4. In example implementation 700, aggregation server 250 may aggregate associated voice emotion and attribute information from a large quantity of audio recordings.

In some implementations, aggregation server 250 may receive voice emotion information from voice analysis device 230. As shown by reference number 710, the voice emotion information may include keywords uttered by speakers in a quantity of audio recordings and/or information indicating whether each keyword is associated with a negative or positive emotion. Additionally, or alternatively, voice emotion information may include information identifying the start time and end time of one or more words uttered with negative or positive emotion, information identifying the duration of words uttered with negative or positive emotion, information identifying a particular speaker, etc. As shown in FIG. 7, voice emotion information may include a quantity of keywords, including "bill," "fees," and "resolved," along with information indicating that the keywords were stated with negative or positive emotion.

As shown by reference number 720, aggregation server 250 may receive attribute information from attribute device 240. This attribute information may include information identifying a particular audio recording and/or information identifying a particular product associated with the audio recording. Additionally, or alternatively, attribute information may include information noting the time of a communication, information identifying the location of a speaker, information identifying a device used by the speaker, etc. As shown in FIG. 7, the attribute information may contain identifiers associated with a quantity of audio recordings and information identifying associated products associated with the audio recordings, including "500 Minute Plan," "Pre-pay plan," and "Corporate Plan."

As shown by reference number 730, aggregation server 250 may associate the voice emotion information with the attribute information. For example, aggregation server 250 may use the unique audio identifier of an audio recording to associate the keyword and emotion information with the product information. Additionally, or alternatively, the keyword and emotion information may be associated with the product information by use of a unique identifier identifying a particular speaker. As shown in FIG. 7, aggregation server 250 uses an audio identification number to associate the voice emotion information with the attribute information.

As shown by reference number 740, aggregation server 250 may aggregate the associated information by combining the associated information into summary information, and/or by combining the associated information into information composed from some subset of the associated information. As shown in FIG. 7, the aggregated information may include particular keywords (e.g., "bill," "fees," and "resolved,"), the number of times those words are stated with negative and positive emotion, and a particular product (e.g., "Corporate Plan," "500 Minute Plan," and "Pre-pay Plan") most frequently associated with the keyword.

Figure 8:
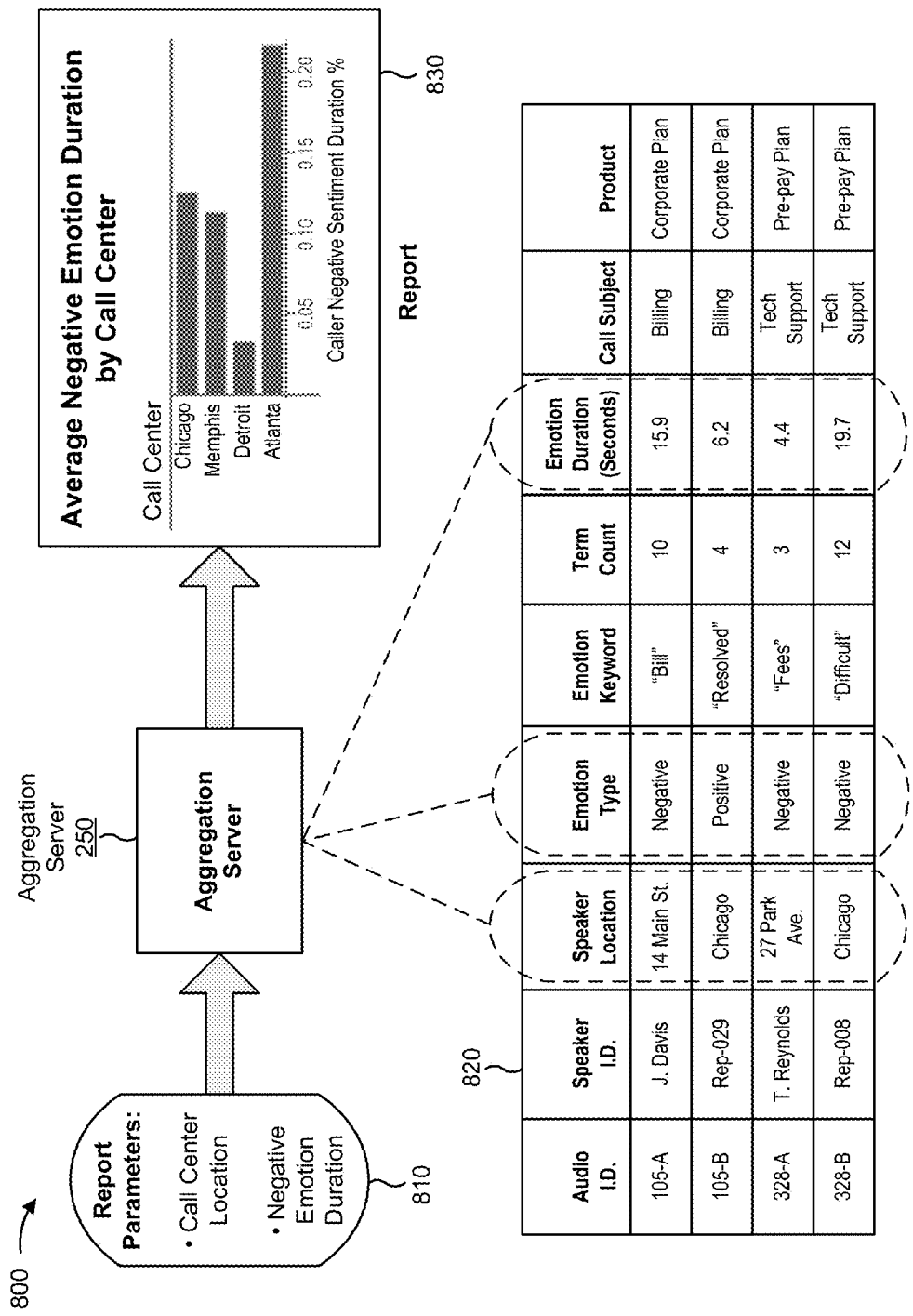

FIG. 8 is a diagram of an example implementation relating to process 600 shown in FIG. 6. In example implementation 800, aggregation server 250 may receive report parameters from reporting device 260 and, based on the aggregated information, may generate a report.

As shown by reference number 810, aggregation server 250 may receive report parameters specifying that aggregation server 250 generate a report based on two or more fields of aggregated information. In some implementations, the report parameters may result from user input received by reporting device 260. Additionally, or alternatively, the report parameters may result from a process not involving user input, such as an automated process, a business rule, a pre-selected set of parameters, and the like. As shown in FIG. 8, the report parameters may request a report of the average duration of words stated with negative emotion associated with several call center locations.

As shown by reference number 820, aggregation server 250 may generate the report by selecting applicable fields and/or by searching for applicable information in the data structure of the aggregated information. Additionally, or alternatively, aggregation server 250 may combine fields and/or information (e.g., sort, summarize, sum, average, subtract, divide, etc.) to generate relevant information. In some implementations, aggregation server 240 may count the number of times, in a quantity of audio recordings, that a keyword is associated with negative and/or positive emotion, and may include the aggregated total in the report. Additionally, or alternatively, aggregation server 250 may count the number of times a particular product is associated with a particular keyword, a particular audio recording, and/or a particular speaker, and may include the aggregated total in the report.

As shown in FIG. 8, aggregation server 250 may search the speaker location field, the emotion type field, and the emotion duration field of the aggregated information to identify call center locations, emotion type, and emotion duration specified in the report parameters. Aggregation server 250 may sum the emotion durations corresponding to each location and may divide the emotion durations by the total number of entries per each location to create an average emotion duration for a given call center. Additionally, or alternatively, aggregation server 250 may use one or more additional fields in the data structure of the aggregated data (e.g., a total call duration field) associated with the specified locations to express the average call emotion duration as a percentage of the total call duration.

As shown by reference number 830, aggregation server 250 may generate a report by displaying the selected aggregated information graphically (e.g., a graph, a pie chart, a bar chart, etc.). Additionally, or alternatively, the report may include information summarized in a textual form (e.g., a list, a column, a table, a spreadsheet, etc.). As shown in FIG. 8, aggregation server 250 may generate a report displaying the average negative emotion duration by call center in a bar chart.

Figure 9:
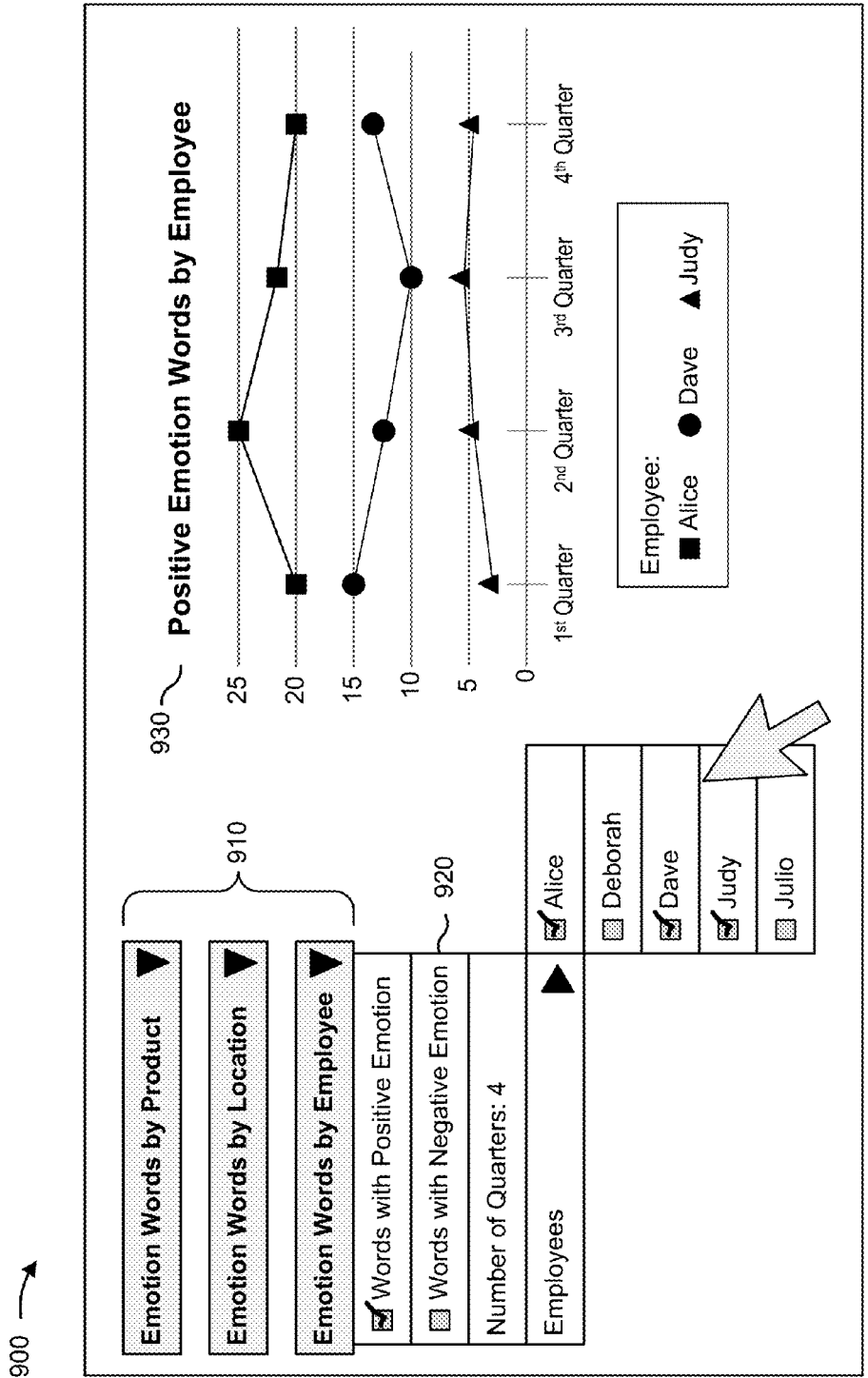

FIG. 9 is a diagram of example implementation 900 relating to process 600 shown in FIG. 6. In example implementation 900, aggregation server 250 may generate a report based on report parameters input by a user of reporting device 260.

As shown by reference number 910, reporting device 260 may provide one or more input options. For example, reporting device 260 may provide input options that include an option to view words stated with negative and/or positive emotion associated with a certain product (e.g., emotion words by product), words stated with negative and/or positive emotion associated with a location (e.g., emotion words by location), and/or words stated with negative and/or positive emotion associated with a call center representative (e.g., emotion words by employee). As shown in FIG. 9, the user of reporting device 260 has selected "Emotion Words by Employee."

As shown by reference number 920, the selection of a particular input option may reveal additional sub-options (e.g., a drop-down menu, a pop-up menu, etc.). For example, the additional sub-options may provide input options that include an option to specify an emotion category (e.g., words with positive emotion, words with negative emotion, etc.), an option to specify a time duration (e.g., a number of quarters, a start and end date, a month, a year, etc.), and/or an option to specify one or more call center representatives (e.g., employees). As shown in FIG. 9, the user of reporting device 260 has selected "Words with Positive Emotion" for the past "4" quarters for employees, "Alice," "Dave," and "Judy."

As shown by reference number 930, reporting device 260 may display a report based on the information input by a user of reporting device 260. For example, reporting device 260 may display the information graphically (e.g., a pie chart, a bar chart, a graph, etc.). As shown in FIG. 9, reporting device 260 has displayed the positive emotion words of three employees as a graph over the course of four quarters.

In some implementations, reporting device 260 may send the information input by a user of reporting device 260 to aggregation server 250 in the form of report parameters. Based on the report parameters, aggregation server 250 may generate a report and provide the report to reporting device 260. Additionally, or alternatively, aggregation server 250 may provide a report to reporting device 260 and reporting device 260 may receive input from a user of reporting device 260 that indicates what portion of the report should be displayed.

Implementations described herein may allow an aggregation server to join information about the emotional content of a speakers' communications with attribute information about the communications to form aggregated information, and generate a report of a subset of the aggregated information. This report may be useful for analyzing the quality of communication between speakers and assessing a first speaker's sentiment toward a second speaker, a product, a service, or the like. This report may also be useful for providing feedback to a speaker (e.g., a merit award to a call center representative who frequently uses words with positive emotion, a warning to a call center representative that an incoming caller has a history of strong emotion, a visual message provided to a speaker's device, etc.).

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term "component" is intended to be broadly construed as hardware, firmware, or a combination of hardware and software.

Some implementations are described herein in conjunction with audio recordings. As used herein, an audio recording may include an analog recording, a digital recording, or the like. Additionally, or alternatively, an audio recording may include any method of observing, detecting, measuring, and/or analyzing an audio sound, and may include real-time analysis of audio sound properties (e.g., a tone, a volume, a pitch, a duration, an amplitude, a frequency, wavelength, etc.) associated with an audio sound.

Certain user interfaces have been described herein. In some implementations, the user interfaces may be customizable by a user. Additionally, or alternatively, the user interfaces may be pre-configured to a standard configuration, a specific configuration based on capabilities and/or specifications associated with a device on which the user interfaces are displayed, or a set of configurations based on capabilities and/or specifications associated with a device on which the user interfaces are displayed.

Some implementations are described herein in conjunction with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more times, and may be used interchangeably with "one or more." Where only one item is intended, the term "one" or similar language is used. Further, the phrase "based on" is intended to mean "based, at least in part, on" unless explicitly stated otherwise.

What is claimed is:

1. A system comprising:
    one or more server devices to:
        receive voice emotion information related to an audio recording,
            the audio recording containing a first vocal utterance of a first speaker and a second vocal utterance of a second speaker, and
            the voice emotion information indicating that the first vocal utterance is spoken with a particular emotion;
        associate a first word or phrase, within the first vocal utterance, with the first speaker and a second word or phrase, within the second vocal utterance, with the second speaker;
        associate the voice emotion information with attribute information related to the audio recording,
            the voice emotion information including information regarding at least one of the first word or phrase or the second word or phrase;
        aggregate the associated voice emotion and attribute information with other associated voice emotion and attribute information to form aggregated information;
        generate a report based on the aggregated information and one or more report parameters; and
        provide the report.

2. The system of claim 1, where the one or more server devices are further to:
    analyze a vocal prosody characteristic of the first vocal utterance; and
    detect that a word or a phrase, within the first vocal utterance, is spoken with the particular emotion based on the vocal prosody characteristic,
        the particular emotion being a negative emotion or a positive emotion, and
        the voice emotion information including information regarding the detected word or phrase.

3. The system of claim 1, where the attribute information includes information identifying at least one of:
    a location of the speaker,
    a product or service related to the speaker, or
    a subject of the first vocal utterance.

4. The system of claim 1, where the one or more server devices, when associating the voice emotion information with the attribute information, are further to:
    join the voice emotion information with the attribute information by use of a unique identifier related to at least one of:
        the audio recording,
        the speaker,
        a location associated with the speaker,
        a product associated with the speaker, or
        a subject associated with the first vocal utterance.

5. The system of claim 1, where the one or more server devices are further to:
    receive the one or more report parameters from a user.

6. The system of claim 1, where the one or more server devices, when generating the report based on the aggregated information and the one or more report parameters, are further to:
    generate a report including a count of words or phrases, within the aggregated information, associated with the particular emotion, relating to at least one of:
        the speaker,
        a location associated with the speaker,
        a product associated with the speaker, or
        a subject associated with first vocal utterance.

7. The system of claim 1, where the one or more server devices are further to:
- analyze a vocal prosody characteristic of the first vocal utterance;
- adjust, based on analyzing the vocal prosody characteristic, the vocal prosody characteristic to create an adjusted vocal prosody characteristic; and
- detect that a word or a phrase, within the first vocal utterance, is spoken with the particular emotion based on the adjusted vocal prosody characteristic.

8. A non-transitory computer-readable medium storing instructions, the instructions comprising:
- a plurality of instructions that, when executed by one or more processors, cause the one or more processors to:
  - receive voice emotion information related to an audio recording,
    - the audio recording containing a vocal utterance of a speaker, and
    - the voice emotion information indicating that the vocal utterance relates to a particular emotion;
  - receive attribute information related to the audio recording;
  - associate the voice emotion information with the attribute information;
  - aggregate the associated voice emotion and attribute information with other associated voice emotion and attribute information to form aggregated information;
  - generate a report based on the aggregated information and one or more report parameters,
    - the report including a count of words or phrases, within the aggregated information, associated with the particular emotion and relating to at least one of:
      - the speaker,
      - a location associated with the speaker,
      - a product associated with the speaker, or
      - a subject associated with the vocal utterance; and
  - provide the report.

9. The computer-readable medium of claim 8, where the plurality of instructions further cause the one or more processors to:
- analyze a vocal prosody characteristic of the vocal utterance; and
- detect that a word or a phrase, within the vocal utterance, is spoken with the particular emotion based on the vocal prosody characteristic,
  - the particular emotion being a negative emotion or a positive emotion, and
  - the voice emotion information including information regarding the detected word or phrase.

10. The computer-readable medium of claim 8, where
the speaker is a first speaker,
the vocal utterance is a first vocal utterance, and
the plurality of instructions further cause the one or more processors to:
- detect that the audio recording includes the first vocal utterance of the first speaker and a second vocal utterance of a second speaker;
- associate a first word or phrase, within the first vocal utterance, with the first speaker; and
- associate a second word or phrase, within the second vocal utterance, with the second speaker,
  - the voice emotion information including information regarding the first word or phrase or the second word or phrase.

11. The computer-readable medium of claim 8, where the attribute information includes information identifying at least one of:
- a location of the speaker,
- a product or service related to the speaker, or
- a subject of the vocal utterance.

12. The computer-readable medium of claim 8, where one or more instructions, of the plurality of instructions, that cause the one or more processors to associate the voice emotion information with the attribute information, further cause the one or more processors to:
- join the voice emotion information with the attribute information by use of a unique identifier related to at least one of:
  - the audio recording,
  - the speaker,
  - a location associated with the speaker,
  - a product associated with the speaker, or
  - a subject associated with the vocal utterance.

13. The computer-readable medium of claim 8, where one or more instructions, of the plurality of instructions, further cause the one or more processors to:
- receive the one or more report parameters from a user.

14. The computer-readable medium of claim 8, where one or more instructions, of the plurality of instructions, further cause the one or more processors to:
- analyze a vocal prosody characteristic of the vocal utterance;
- adjust, based on analyzing the vocal prosody characteristic, the vocal prosody characteristic to create an adjusted vocal prosody characteristic; and
- detect that a word or a phrase, within the vocal utterance, is spoken with the particular emotion based on the adjusted vocal prosody characteristic.

15. A method comprising:
- receiving, by one or more processors, voice emotion information related to an audio recording,
  - the audio recording containing a first vocal utterance by a first speaker and a second vocal utterance of a second speaker, and
  - the voice emotion information indicating that the first vocal utterance is spoken with a particular emotion;
- associating, by one or more processors, a first word or phrase, within the first vocal utterance, with the first speaker and a second word or phrase, within the second vocal utterance, with the second speaker;
- associating, by one or more processors, the voice emotion information with attribute information, related to the first speaker, within a data structure,
  - the voice emotion information including information regarding at least one of the first word or phrase or the second word or phrase;
- aggregating, by one or more processors and within the data structure, the associated voice emotion and attribute information with other associated voice emotion and attribute information to form aggregated information;
- receiving, by one or more processors, one or more report parameters;
- generating, by one or more processors, a report based on the aggregated information and the one or more report parameters; and
- outputting, by one or more processors, the report for display.

16. The method of claim 15, further comprising:
- analyzing a vocal prosody characteristic of the first vocal utterance; and detecting that a word or a phrase, within the first vocal utterance, is spoken with the particular emotion based on the vocal prosody characteristic, the particular emotion being a negative emotion or a positive emotion, and the voice emotion information including information regarding the detected word or phrase.

17. The method of claim 15, where the attribute information includes information identifying at least one of:
    a location of the speaker,
    a product or service related to the speaker, or
    a subject of the first vocal utterance.

18. The method of claim 15, where associating the voice emotion with the attribute information further comprises:
    joining the voice emotion information with the attribute information by use of a unique identifier related to at least one of:
    the audio recording,
    the speaker,
    a location associated with the speaker,
    a product associated with the speaker, or
    a subject associated with the first vocal utterance.

19. The method of claim 15, where generating the report based on the aggregated information and the one or more report parameters further comprises:
    generating a report including a count of words or phrases, within the aggregated information, associated with the particular emotion, relating to at least one of:
    the speaker,
    a location associated with the speaker,
    a product associated with the speaker, or
    a subject associated with the first vocal utterance.

20. The method of claim 15, further comprising:
    analyzing a vocal prosody characteristic of the first vocal utterance;
    adjusting, based on analyzing the vocal prosody characteristic, the vocal prosody characteristic to create an adjusted vocal prosody characteristic; and
    detecting that a word or a phrase, within the first vocal utterance, is spoken with the particular emotion based on the adjusted vocal prosody characteristic.

\* \* \* \* \*